Patented June 17, 1941

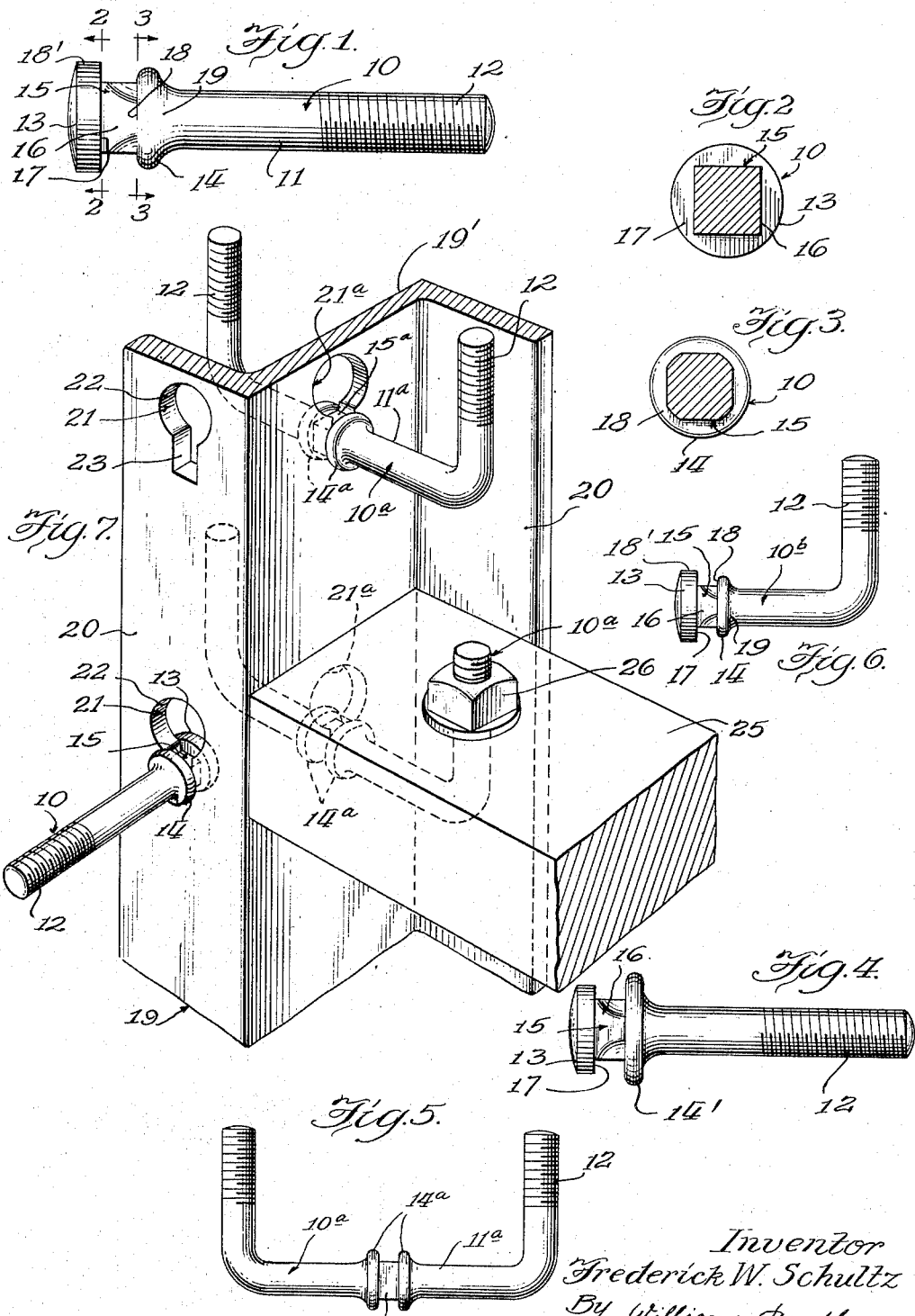

2,246,457

UNITED STATES PATENT OFFICE 2,246,457

BOLT AND MOUNTING THEREFOR

Frederick W. Schultz, Wichita, Kans.

Original application May 7, 1938, Serial No. 206,563. Divided and this application April 7, 1939, Serial No. 266,475

9 Claims. (Cl. 85—1)

My invention relates to bolts and mountings therefor. It is particularly concerned with an improved mounting for the head end of a bolt in a plate or plate-like flange of a structural member, whereby the head end of the bolt is rigidly mounted with the threaded end of the bolt protruding outwardly from the plate or flange. Bolts thus mounted may be used to clamp sheets of insulation, or the like, and, because the bolts protrude outwardly and are rigidly mounted at their heads, the bolts will successfully withstand considerable abuse when a sheet is pushed upon a plurality of such bolts, so that the bolts punch their own holes through the sheet. Even in applying brackets, hangers, or other such things, where holes are pre-formed for the anchoring bolts, a head-mounted bolt is subjected to considerable abuse in the form of axially directed blows or sidewise blows. Because of the length of the bolt, any sidewise blow, which is apt to be delivered near the threaded end, gives considerable leverage tending to bend, break or loosen the bolt at its head mounting. Therefore, a satisfactory head mounting for a bolt must be rugged, strong and adapted successfully to withstand such strains.

Another attendant problem in the mounting of a protruding bolt is to insure that it is brought into, and maintained at, the proper angle—usually a right angle—to the plane of the member on which it is mounted. Otherwise, when it comes to applying a metal or wood strip or sheet with a number of pre-formed bolt holes, variously angled bolts will not register with the holes.

The chief object of my invention is the provision of an improved bolt and means for mounting it in protruding position wherein: (a) the bolt itself adequately withstands the above mentioned strains as against bending or breaking the bolt; (b) the head mounting better precludes swinging or rocking of the bolt in its mounting and thereby insures a rigid and more accurate alignment of the bolt in reference to the plane of the member in which it is mounted; (c) the bolt is held against both forward and rearward axial movement; (d) the bolt is held against rotation so that a nut may be tightened upon it without having to use another wrench and hand to hold the bolt; and (e) the bolt is easily and quickly installed in its mounting, but not readily inadvertently dislodged.

Another object of my invention is a bolt of this type which cannot be passed entirely through the mounting slot and thereby lost behind the plate in which the bolt was to be mounted.

Other objects of my invention are concerned with improved U bolts and J bolts which present much the same problem of mounting.

The foregoing together with further objects, features and advantages of my invention are set forth in the following description of specific embodiments thereof and illustrated in the accompanying drawing, wherein:

Fig. 1 is a side elevation of the bolt of my invention;

Fig. 2 is a cross section of the bolt taken on the line 2—2 of Fig. 1;

Fig. 3 is a cross section of the bolt taken on the line 3—3 of Fig. 1 and looking in the opposite direction;

Fig. 4 is a view similar to Fig. 1, but on a reduced scale, and showing a modified form of invention characterized by an enlarged collar;

Fig. 5 is an elevation of a U bolt embodying my invention;

Fig. 6 is a similar elevation of a J bolt embodying my invention; and

Fig. 7 is a perspective view of a fragment of an upright structural Z member showing keyhole-shaped slots in the flange mounting the bolts of my invention and keyhole-shaped slots in the web mounting the U bolts of my invention.

The bolt of my invention—which may aptly be termed a collar bolt—is indicated generally as 10 in the drawing. Its cylindrical shank 11 is provided with threads 12 running headward from its free end. Spaced a short distance from the head 13 is an integral collar 14 annularly surrounding the shank defining a neck 15 between the head and collar. The neck is squared as indicated at 16, preferably after the fashion of a carriage bolt, whereby the cross section adjacent the head, as shown in Fig. 2, is square and the cross section adjacent the collar, as shown in Fig. 3, is round or but slightly flattened. The interfacial dimension of the squared neck is preferably the same as or but slightly greater than the diameter of the shank. For example, in bolts having ⅜ inch to ⅝ inch shank diameters, the interflat dimension of the squared neck may be $\frac{1}{16}$ of an inch greater than the diameter of the shank. Thus the periphery of the shank is a circle which would geometrically substantially inscribe the squared neck, or conversely the squared neck would substantially circumscribe the shank. The important point is that the neck is of a cross sectional shape and area which gives it as much strength as, and preferably a little more strength than, the shank, but at the same time the head serves as an adequate head for the bolt without requiring that the head be of greater diameter than is more or less standard for a bolt of that size.

The shoulder 17 of the head and the shoulder 18 of the collar which faces it, are both flat and lie in planes at normals to the axis of the bolt. The back side of the collar, however, is provided with a generous fillet 19 which serves as a brace for the collar.

The rim face 18 of the collar has considerable thickness, and the thickness of the collar is preferably but a trifle less than that of the head.

It will be seen that the bolt substantially conforms with a standard carriage bolt except for the inclusion of the collar and the width of the rim face of the head.

In Fig. 7 I have shown a typical installation of the bolt whereby it is mounted at its head in a flange or plate-like portion of a structural member. The structural member is here shown as a Z-shaped upright 19. In one of its flanges 20 is a series of keyhole-shaped slots 21 cut therethrough. Each slot comprises a circular head 22 and a leg portion 23 opening into the head. The axial length of the neck of the bolt is determined by the thickness of the plate-like portion through which the keyhole slot is cut and in which the bolt is to be mounted. For practical production purposes, the length of the neck is preferably the same as or up to $\frac{1}{32}$ of an inch less than the thickness of the plate. The width of the leg of the slot is preferably the same as the inter-flat dimension of the neck, and the depth of the leg of the slot is about the same as the width of the leg. The diameter of the head of the slot is $\frac{1}{16}$ of an inch or so greater than the diameter of the head of the bolt, so that the head of the bolt can easily be passed through the head of the slot.

In practice the keyhole slots are generally preformed in the structural member (here shown as a Z-beam) at the mill or fabricating plant. After the upright is installed, the bolts may be installed at any time, but if a bolt is never mounted in a slot, no objectionable result follows, since the keyhole slots are relatively small and do not structurally weaken the plate or flange. This feature is of considerable advantage, because it makes it feasible to employ a number of keyhole slots in the plate or flange in excess of what will probably be actually used. This makes it unnecessary to determine definitely in advance how many bolts will be mounted and where they will be mounted.

When a bolt is to be mounted in one of the slots, it is brought head first into axial alignment with the head of the slot and moved axially to pass the head of the bolt—but not the collar—through the head of the slot. This positions the neck in the plane of, in register with, and directly over the leg 23 of the slot. A smart hammer blow administered downwardly upon the collar (or on the bolt head, if the bolt head is conveniently accessible), will drive the neck home in the leg 23 of the slot; but it is preferable to use a hammer on a punch placed against the top flat of the neck, thereby eliminating tendency to tilt and bind the bolt in the mouth of the leg of the slot.

The bead-like annular conformation of the collar, as indicated at 14, serves as a chamfer to guide and wedge the margin of the plate into the annular groove between the head and shoulder of the bolt. The facing parallel shoulders of the head and collar of the bolt are forced into permanent surface contact with the respective surfaces of the plate. This serves rigidly to maintain the bolt, once mounted, at a true normal to the plane of the plate or flange. The snug contact of the two vertical flats of the square neck with the vertical edges of the leg 23 of the slot also serves to help maintain the bolt in a rigid mounting and precludes turning of the bolt. The fit of the neck in the leg of the slot, and the fit of the plate margining the slot between the shoulder and head of the bolt, preferably are such that they involve a slight flow or deformation of the metal of one or both whereby a tight and permanent fit is effected.

One feature of my bolt and its mounting is that but a fraction of an inch of clearance at the back side of the plate or flange adjoining the slot is required for the installation of the bolt.

Any force tending to move the bolt axially forwardly, as by tightening a nut on the bolt against some object which intervenes between the neck and the plate or flange, is resisted by the head of the bolt. Any tendency to thrust the bolt axially rearwardly is resisted by the collar. Downward or sidewise translation of the bolt is resisted by the contact of the neck with the edges of the leg of the keyhole slot. Upward translation of the bolt—which would be the most unlikely—is resisted by the effect of gravity on the bolt and on whatever is suspended by the bolt and by the frictional binding of the bolt in the slot. However, when it is desired intentionally to remove the bolt from its mounting, this may be done by an upward blow of a hammer on, or very close to, the collar (or on the head, if accessible) to drive the neck out of the leg of the slot and permit the head of the bolt to be withdrawn from the head of the slot, that is, by a reversal of the technique of application. Neither the bolt nor the slot is so impaired that either cannot be used again in the same different combination.

Any blow or thrust applied vertically, horizontally or obliquely to the bolt at its threaded end and tending to rock the bolt to an oblique position in its mounting, is resisted by the contact between the neck and the edges of the leg of the slot and also by the firm surface contact of the shoulders of the head and of the collar against the respective sides of the plate or flange adjacent the slot.

Special attention is called to the fact that the neck is not weakened relative to the shank, but in fact is even stronger than the shank as regards bending or breaking in any direction, and this is important because it is at the neck that the greatest strain would be applied, due to the leverage afforded by the length of the bolt in the event of sidewise pressure applied to the threaded end of the bolt.

The generous fillet on the side of the collar remote from the bolt head serves effectively to brace the collar against an axial displacement at any side of the collar. A sidewise blow or excessive pressure on the bolt near its threaded end might tend to such displacement.

In Fig. 4 I have shown a modification which differs from the form shown in Fig. 1 only in increasing the diameter of the collar 14' to a diameter which is in excess of the diameter of the head 22 of the keyhole slot. This makes it impossible for the collar to pass through the slot and, therefore, eliminates any possibility of a bolt, in careless application, slipping out of the fingers of the operator and falling down at the back side of the plate or flange, from which location it might not be easily extractable. In the instance of the modification of Fig. 4, the diameter of the collar would be about ⅛ of an inch greater than the diameter of the head in the bolt sizes previously mentioned.

I have thus provided a bolt head mounting which enables a bolt to be readily mounted successfully to withstand the various pressures and blows to which the protruding shank of the bolt may be subjected and in which the bolt is still susceptible of economical quantity manufacture by the same manufacturing methods ordinarily used for bolts and without greatly increasing their cost of manufacture.

In Fig. 5 I have illustrated my invention incorporated in a U bolt 10a. At some mid point in the web of the shank 11a are a pair of spaced collars 14a, each of which is similar to the collar 14 of Fig. 1, defining a squared neck 15a therebetween. The squared neck 15a is the same size in proportion to the shank 11a as is the neck 15 in proportion to the shank 11 in Fig. 1.

In Fig. 7 I have shown the plate-like web of the Z member 19 provided with keyhole slots 21a which are like the slots 21. I have shown U bolts 10a mounted in those slots 21a. The mounting of the U bolt is accomplished by inserting one of the upturned threaded ends of the U bolt through the head of the slot and passing the bolt through the slot until the collars 14a come on either side of the plane of the web. Then the U bolt is given a downward hammer blow to seat the neck tightly in the leg of the slot. The adjacent faces of the collars 14a then make firm contact with the respective sides of the web. This mounting, it will be seen, is similar to the mounting of the bolt of Fig. 1, except that instead of the bolt being mounted at its head, it is mounted at a mid point with the shank extending in both directions.

Such U bolts may be used, for example, for conveniently mounting the ends of wooden rails 25 which may serve as nailing strips. For this purpose the rail 25 near its end is provided with a vertical hole to receive the upturned and threaded end of the shank of the U bolt. The rail 25 rests upon the horizontal reach of the shank and is clamped in place by a nut 26 threaded on the end of the shank.

In Fig. 6 I have shown a J bolt 10b which is like the bolt of Fig. 1, except that its shank is turned upwardly. Such a J bolt is convenient for use in lieu of a U bolt where a rail extends from only one side of the web of a Z bar or channel. Also the J bolt may be used on the front flanges of a Z bar or channel in lieu of a straight bolt, if a rail rather than a vertical sheet is to be mounted.

Both the J bolts and the U bolts may, if occasion requires, be mounted with the shank ends extending downwardly or horizontally. This is because the squared neck affords four different positions. For most purposes it is advisable that the four flats of the neck be aligned with or at right angles to the offset ends of the shanks.

This application is in the nature of a division of my application Serial No. 206,563 filed May 7, 1938, on Building construction, allowed September 25, 1940.

I claim:

1. The combination with a plate-like portion of a structural member having a keyhole-shaped slot therethrough, of a one piece attaching member mounted in the slot for attaching other members to the structural member, the attaching member comprising a threaded portion extending at a normal to the plane of the plate-like portion, a head of but slightly less diameter than the head of the slot and insertable therethrough, the head being disposed against one side of the plate-like portion in contact therewith adjoining the margins of the leg of the slot, a collar disposed against the other side of the plate-like portion in contact therewith adjoining the margins of the leg of the slot, and a reduced neck extending between the head and collar and of squared section, opposed flats of which engage the lateral edges of the leg of the slot to prevent turning, the head, collar, neck and threaded portion all being integral parts of the attaching member, the collar being too large to pass through the head of the slot.

2. The combination with a plate-like portion of a structural member having a keyhole-shaped slot therethrough, of a U-bolt mounted therein by the web portion of its shank, the web portion having an axially spaced pair of collars formed integrally with the shank and presenting facing annular shoulders in firm contact with the respective surfaces of the plate-like portion at the margins of the leg of the keyhole, the shank having a short neck portion formed between the collars of a size giving the neck not substantially less strength than the shank beyond the collars, the neck being squared with its respective pairs of flats parallel with and at right angles to the plane of the U-bolt.

3. The combination with a plate-like portion of a structural member having a slot therethrough, of a bolt having a head, an integral collar annularly surrounding the bolt and spaced from the head by the thickness of the portion and defining a neck which passes through the slot and has a flat engaging an edge of the slot to prevent rotation of the bolt in the slot, and a shank extending axially outwardly from the collar and away from the head, the shank being threaded from its outer end, and the head and collar presenting facing annular shoulders firmly contacting the respective sides of the plate-like portion adjoining the slot.

4. A bolt, to be mounted in a slotted plate or the like to maintain itself therein in rigid outstanding position, comprising a shank threaded inwardly from the outstanding end, a head at the mounted end to lie at the back side of the plate, an integral collar like formation outstanding from the shank and axially spaced a short distance forwardly of the head to lie at the front side of the plate, and a neck extending between the head and collar like formation to lie within the slot and flatted to engage an edge face of the slot to prevent turning of the bolt within the slot, the head and collar like formation presenting opposed shoulders surrounding the neck and adapted to lie in substantially firm flatwise contact with the back side and in pinching contact with the front side, respectively, of the plate adjoining the margins of the slot to hold the bolt against rocking and axial shifting in the slot.

5. A bolt to be mounted at its head end upon a plate which has a parallel-sided open-ended slot therethrough, to maintain itself firmly in outstanding non-rocking and non-turning position relative to the plate even in the absence of other parts, the bolt comprising a straight shank screw-threaded inwardly from its outstanding end, a circular head at the other end to be passed rearwardly past the plane of the plate and to lie at the back side of the plate, an integral circular collar surrounding the shank and axially spaced a short distance forwardly of the head to lie at the front side of the plate, and a squared neck extending between the head and collar to be passed sidewise into the slot through the open end of the slot in any one of four angular positions to lie within the slot, the neck having about the same diameter as the shank and its squared surfaces being adapted to engage side edges of the slot to withhold the bolt from turning within the slot, the head and collar being of considerably greater diameter than the shank and neck, the head presenting a broad flat annular shoulder extending from the neck at a normal to the axis of the bolt to lie in firm flatwise contact with the back side of the plate adjoining the slot, and the collar presenting a shoulder surrounding the neck and opposing the head shoulder to lie in firm pinching contact with the front of the plate at the margin of the slot.

6. The combination of a structural member having a plate portion with a parallel-sided open-ended slot therethrough, and a bolt mounted at its head end in the plate portion and firmly maintained relative thereto in outstanding, non-rocking and non-turning position even in the absence of other structure, the bolt comprising a shank screw-threaded inwardly from its outstanding end, a head at the other end lying at the back side of the plate, an integral collar surrounding the shank and axially spaced a short distance forwardly of the head and lying at the front side of the plate, and a flatted neck extending between the head and collar and lying within the slot with a flatted surface engaging a side edge of the slot to restrain the bolt from turning therein, the transverse dimensions of the neck being not substantially less than, nor considerably greater than, those of the shank, the head and collar being considerably larger transversely than the neck, the head having a forwardly facing flat shoulder adjoining the periphery of the neck lying at a normal to the axis of the bolt, and the collar having a rearwardly facing shoulder adjoining the periphery of the neck and making pinching contact with front side of the plate portion at the margin of the slot to maintain the head shoulder in firm flatwise contact with the back side of the plate marginally of the slot.

7. A U-bolt to be mounted medially of itself in a slotted plate or the like, consisting of a shank having coplanar leg portions threaded inwardly from their ends and a connecting web portion, a pair of axially spaced collars formed integrally with, and surrounding, the web portion of the shank at a mid point, the collars presenting parallel facing shoulders closely spaced to approximate the thickness of the plate to lie against the respective sides of the plate adjoining its slot, the collars defining a neck extending therebetween to be inserted laterally into, and to lie within, the slot, the neck being squared to a cross-sectional area approximately equal to that of the web portion of the shank beyond the collars, whereby facets of the square will engage edges of the slot to restrain the bolt from turning and the collar shoulders will restrain the bolt from axial shifting and rocking within the plate.

8. A one-piece bolt to be mounted in a slotted plate-like member to maintain itself in outstanding position thereon, the bolt having a shank screw-threaded inwardly from one end to stand out from the plate, a head at the other end to lie against the back side of the plate-like member, and a collar surrounding the shank to lie against the front side of the plate-like member, and axially spaced from the head by a short squared neck to lie within and engage the slot to restrain the bolt from turning, the squared neck having a cross-sectional area not substantially less than that of the shank, the head and collar presenting opposed parallel faces to overlie the respective sides of the plate-like element adjoining its slot whereby to restrain the bolt from axial shifting and rocking within the plate-like element.

9. A bolt, to be mounted at a mid point in a keyhole slotted plate or the like and maintain itself outstanding therein, having right and left shank portions axially aligned, to protrude from either side of the plate, and a pair of enlarged collar-like portions substantially coaxial with and surrounding the shank portions and axially spaced apart to approximate the thickness of the plate and presenting opposed parallel shoulder faces to lie against the respective sides of the plate and restrain the bolt from axial shifting and from rocking within the plate, the collar-like portions defining a short neck portion extending between them to lie within the slot, the cross-section of the neck portion being of a shape and area giving the neck portion strength in all directions not substantially less than the shank portions, the neck portion having a pair of diametrically opposed broad flats spaced apart a distance which is neither substantially less than, nor considerably greater than, the diameter of the shank portions for engaging sides of the slot to restrain the bolt from turning in the plate.

FREDERICK W. SCHULTZ.